US010338729B2

(12) United States Patent
Xue et al.

(10) Patent No.: US 10,338,729 B2
(45) Date of Patent: Jul. 2, 2019

(54) TOUCH CONTROLLER HAVING A DISPLAY SCREEN

(71) Applicant: OKIN Refined Electric Technology Co., Ltd., Jiaxing, Zhejiang (CN)

(72) Inventors: Shiguang Xue, Zhejiang (CN); Weili Zhou, Zhejiang (CN); Hongqing He, Zhejiang (CN); Long Li, Zhejiang (CN)

(73) Assignee: OKIN Refined Electric Technology Co., Ltd. (CN)

( * ) Notice: Subject to any disclaimer, the term of this patent is extended or adjusted under 35 U.S.C. 154(b) by 182 days.

(21) Appl. No.: 15/373,411

(22) Filed: Dec. 8, 2016

(65) Prior Publication Data

US 2018/0052559 A1    Feb. 22, 2018

(30) Foreign Application Priority Data

Aug. 19, 2016 (CN) .......................... 2016 1 0697603

(51) Int. Cl.
*G06F 3/041* (2006.01)
*G02F 1/1333* (2006.01)

(52) U.S. Cl.
CPC ........ *G06F 3/0416* (2013.01); *G02F 1/13338* (2013.01)

(58) Field of Classification Search
CPC .......................... G06F 3/0416; G02F 1/13338
See application file for complete search history.

(56) References Cited

U.S. PATENT DOCUMENTS

2015/0169124 A1* 6/2015 Le .......................... G06F 3/0412
                                                              345/173
2016/0021168 A1* 1/2016 Chaudhri .............. H04L 67/025
                                                              715/740

OTHER PUBLICATIONS

Yan, Anny; ADPT012 V11.1, Dec. 26, 2014, www.iada.cn, p. 6, section 7.1 (Year: 2014).*

* cited by examiner

*Primary Examiner* — Jonathan A Boyd (57) ABSTRACT

A touch controller having a display screen comprising a display screen, a touch integrated module, a control circuit and a housing. The display screen, touch integrated module and control circuit are separately fixed to the housing. The touch integrated module is connected to the control circuit, and the touch integrated module can be triggered to send an instruction to the control circuit. The display screen is connected to the control circuit, showing the operational information of the instruction after the data processing of the control circuit. The touch controller having a display screen can simultaneously control at least two drivers.

7 Claims, 7 Drawing Sheets

TOUCH CONTROLLER HAVING A DISPLAY SCREEN

TECHNICAL FIELD OF THE INVENTION

The present invention relates to the field of electrical control technology, and more particularly, to a touch controller having a display screen.

BACKGROUND OF THE INVENTION

In the prior art, the adjustable chairs are usually "one-to-one" controlled. Namely, one adjustable chair is separately controlled by a designated controller. In such case, each adjustable chair must be equipped with a controller, resulting in operational inefficiencies and increased production costs. In the commercial context, the adjustable chairs need to be separately re-adjusted into a consistent state so as to maintain a coherent image, a process that is very difficult to achieve utilizing the conventional art.

SUMMARY OF THE INVENTION

The purpose of the present invention is to overcome the shortcomings in the prior art and provide a touch controller having a display screen, which has advantages of a reasonable structure and convenient control.

To achieve the above purpose, the present invention adopts the following technical solution:

A touch controller having a display screen comprises a display screen, a touch integrated module, a control circuit and a housing. The display screen, the touch integrated module and the control circuit are separately fixed to the housing. The touch integrated module is connected to the control circuit, and the touch integrated module can be triggered to send an instruction to the control circuit. The display screen is connected to the control circuit, showing the operational information of the instruction after the data processing of the control circuit. The touch controller having a display screen can simultaneously control at least two drivers.

In another embodiment of the present invention, the touch integrated module comprises a switching button for selecting a driver, a regulating button of the first driver, a regulating button of the second driver and a reset button. The touch integrated module and the display screen are fixedly installed at the same side of the housing.

The touch integrated module further comprises a light-control button.

In another embodiment of the present invention, the control circuit comprises a microcontroller, a power circuit, a touch circuit, a control terminal and a LCD display circuit. The power circuit is connected to the microcontroller, providing power to the microcontroller. The touch circuit is connected to the microcontroller so that an instruction can be sent to the microcontroller through the touch circuit. The microcontroller can recognize the instruction sent by the touch circuit and send the action instruction to a corresponding control terminal. Additionally, the control terminal comprises a motor control circuit; and, the motor control circuit comprises a first relay, a first diode, a second relay, a second diode and a voltage dependent resistor. The closed terminal of the closed contact of the first relay is connected to the second relay. The normally-open terminal of the first relay and that of the second relay are connected to the forward voltage. The common terminal of the first relay and that of the second relay are respectively connected to the driver. The voltage dependent resistor is connected between the common terminal of the first relay and the second relay. The two ends of the coil of the first relay and the second relay are connected to the power circuit. Further, the first diode and the coil of the first relay are connected in parallel. The negative electrode of the first diode is connected to the positive electrode of the power circuit. The second diode and the coil of the second relay are connected in parallel. The negative electrode of the second diode is connected to the positive electrode of the power circuit. The LCD display circuit is connected to the microcontroller, showing the status information of the control terminal.

The power circuit of the present invention comprises a DC-DC power module, a second inductance, a first voltage-regulator tube, a fifth capacitor, a second voltage-regulator tube, a sixth capacitor, a seventh capacitor, an eighth capacitor, a third resistor, a fourth resistor, a fifth resistor and a sixth resistor. The input pin of the DC-DC power module is connected to the second inductance. The positive electrode of the fifth capacitor is connected to the input pin of the DC-DC power module. The negative electrode of the fifth capacitor is connected to the ground pin of the DC-DC power module. The other end of the second inductance is connected to one end of the first voltage-regulator tube, and the other end of the first voltage-regulator tube is connected to the ground pin of the DC-DC power module. The second voltage-regulator tube is connected between the output pin of the DC-DC power module and the ground pin of the DC-DC power module. The sixth capacitor and the second voltage-regulator tube are connected in parallel. The positive electrode of the seventh capacitor is connected to the output pin of the DC-DC power module, and the negative electrode of the seventh capacitor is connected to the ground pin of the DC-DC power module. One end of the third resistor is connected to the positive electrode of the fifth capacitor, and one end of the fourth resistor is connected to the negative electrode of the fifth capacitor. Further, one end of the fifth resistor is connected to the positive electrode of the fifth capacitor, and one end of the sixth resistor is connected to the negative electrode of the fifth capacitor. The eighth capacitor is connected in series between the fifth resistor and the sixth resistor.

In another embodiment of the present invention, the motor control circuit comprises at least two independent circuits.

Additionally, the touch circuit of the present invention comprises a touch sensitive chip, of which the model number is ADPT012. The twenty-third pin of the touch sensitive chip is connected to one end of the seventh resistor, and the other end of the seventh resistor is connected to the eighteenth pin of the touch sensitive chip.

In another embodiment of the present invention, the control terminal of the present invention comprises a cooling, heating and massage control circuit. The cooling, heating and massage control circuit further comprises a control circuit and a load power circuit. The control circuit controls the on/off function of the load power circuit. The load power circuit comprises a step-down chip and an external circuit. The external circuit comprises a first capacitor, a second capacitor, a third capacitor, a fourth capacitor, a first inductance, a first resistor, a second resistor and a fourth diode. The first inductance and the second resistor are connected in series between the third pin of the step-down chip and the second pin of the step-down chip. The first inductance and the second resistor are connected in series. The connection point between the first inductance and the second resistor, which is connected to the fourth capacitor, is further connected to the ground. The positive electrode of the fourth diode is connected to the negative electrode of the third capacitor, and the negative electrode of the fourth diode is connected to the third pin of the step-down chip. The positive electrode of the fourth diode and the negative electrode of the third capacitor are connected to the ground. The second resistor is connected in series between the first pin of the step-down chip and the second pin of the step-down chip. The second pin of the step-down chip is connected to the negative electrode of the third diode, and the positive electrode of the third diode is connected to a DC power. The fourth pin of the step-down chip is connected to the fifth pin of the step-down chip through the second capacitor. The fifth pin of the step-down chip is connected to the positive electrode of the first capacitor, and the negative electrode of the first capacitor is connected to the ground. The control circuit comprises a first field-effect transistor, a second field-effect transistor and a third field-effect transistor. The source electrodes of the first field-effect transistor, the second field-effect transistor and the third field-effect transistor are connected. The drain electrode of the first field-effect transistor is connected to the cooling equipment. The drain electrode of the second field-effect transistor is connected to the heating equipment. The drain electrode of the third field-effect transistor is connected to the massage apparatus. The model number of the chip of the step-down DC power converter is XL4015.

In another embodiment of the present invention, the control terminal comprises a RGB color-mixing circuit. The RGB color-mixing circuit comprises a first triode, a second triode and a third triode. The source electrodes of the first triode, the second triode and the third triode are connected to the ground. The grid electrodes of the first triode, the second triode and the third triode are connected to the microcontroller. The drain electrodes of the first triode, the second triode and the third triode are connected to the RGB three-colored LED.

Another embodiment of the present invention comprises a sensor. The sensor is connected to the control circuit; and, the control circuit can receive the information collected by the sensor and send a control instruction to the RGB color-mixing circuit.

Additionally, once the switching button of the present invention is pressed, the selection of the driver is changed accordingly, and the display screen can show which driver is currently selected. The operational information of the selected driver can also be displayed on the screen. Once the regulating button of a corresponding driver is triggered, the corresponding driver can receive and run the instruction when the information is correctly processed. The selection of the driver is changed in the following process: once the switching button is pressed, a driver is sequentially selected, and when each driver has been sequentially selected once, all of the drivers are selected together when the switching button is pressed. The selecting process can be repeated in such a way.

When the drivers are selected together—thereby triggering the regulating button—all of the drivers can be controlled. Additionally, all of the drivers can be reset by triggering the reset button.

Compared with the prior art, the present invention has an advantage of using only one controller to simultaneously control a plurality of adjustable seats via a centralized control with a convenient control function.

BRIEF DESCRIPTION OF THE DRAWINGS

To clearly expound the present invention, the drawings and embodiments are hereinafter combined and described in detail. Obviously, the drawings are merely some embodiments of the present invention and those skilled in the art can associate themselves with other drawings without paying creative labor.

DETAILED DESCRIPTION OF THE INVENTION

Drawings and detailed embodiments are combined hereinafter to elaborate the technical principles of the present invention.

Embodiment 1

Figure 1:
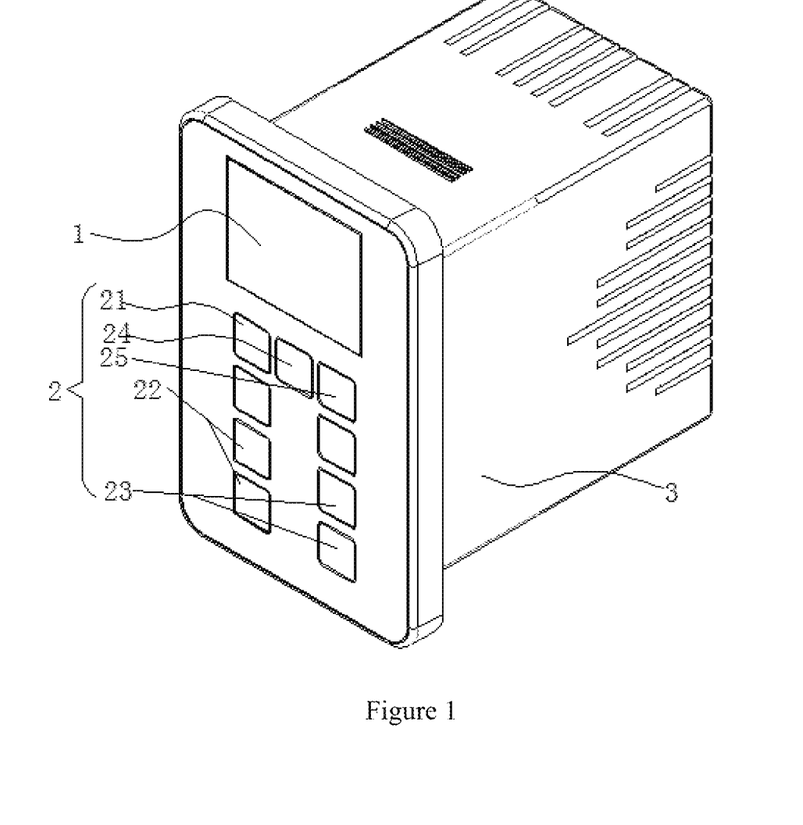
FIG. 1 is a structure diagram of the present invention.

As shown in FIG. 1, a touch controller having a display screen comprises a display screen 1, a touch integrated module 2, a control circuit and a housing 3. The display screen 1, the touch integrated module 2 and the control circuit are separately fixed to the housing 3. The touch integrated module 2 is connected to the control circuit, and the touch integrated module 2 can be triggered to send an instruction to the control circuit. The display screen 1 is connected to the control circuit, showing the operational information of the instruction after the data processing of the control circuit. Further, the touch controller having a display screen can simultaneously control at least two drivers.

The touch integrated module 2 of the present invention comprises a switching button 21 for selecting a driver, a first driver regulating button 22, a second driver regulating button 23 and a reset button 24. The touch integrated module 2 and the display screen 1 are fixedly installed at the same side of the housing 3.

The touch integrated module 2 in this embodiment further comprises a light-control button 25, which can control the lighting fixture connected to the control circuit.

Figure 2:
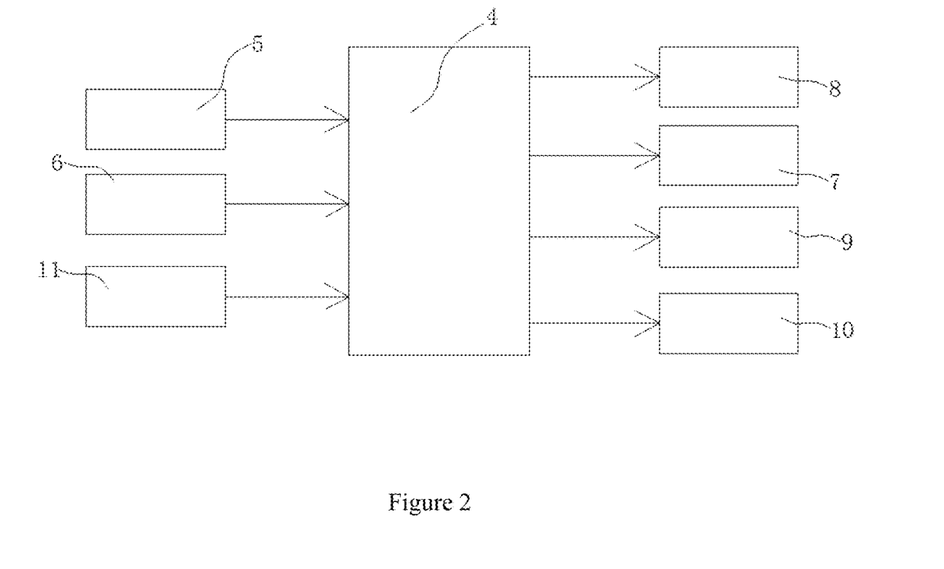
FIG. 2 is a structure diagram of the control circuit of the present invention.
Figure 4:
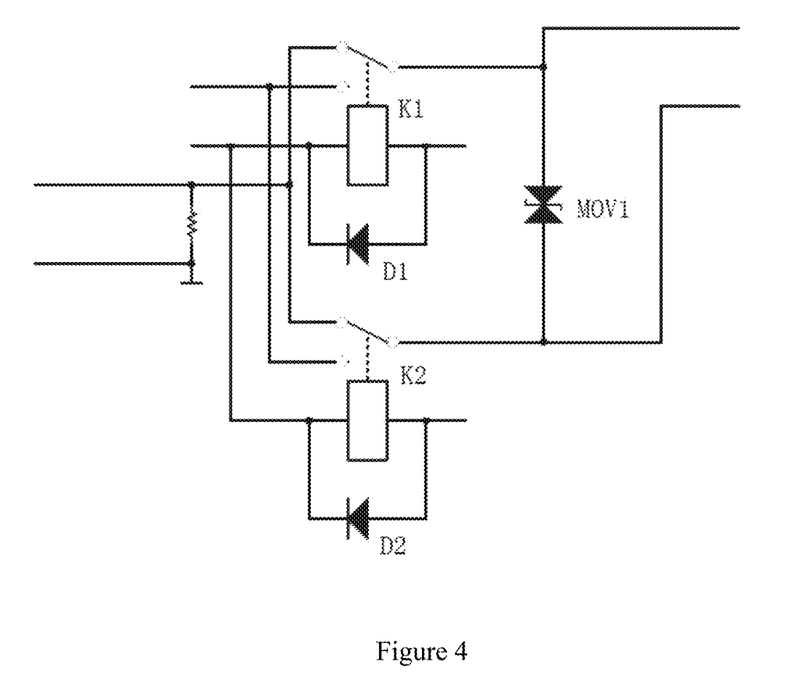
FIG. 4 is a structure diagram of the motor control circuit of the present invention.

As shown in FIGS. 2 and 4, the control circuit of the present invention comprises a microcontroller 4, a power circuit 5, a touch circuit 6, a control terminal and a LCD display circuit 7. The power circuit 5 is connected to the microcontroller 4, providing power to the microcontroller 4. The touch circuit 6 is connected to the microcontroller 4 so that an instruction can be sent to the microcontroller 4 through the touch circuit 6. The microcontroller 4 can recognize an instruction sent by the touch circuit 6 and send the action instruction to a corresponding control terminal. The control terminal comprises a motor control circuit 8. The motor control circuit 8 comprises a first relay K1, a first diode D1, a second relay K2, a second diode D2 and a voltage dependent resistor MOV1. The terminal of the contact of the first relay K1, which is normally closed, is connected to the second relay K2. The normally-open terminal of the first relay K1 and that of the second relay K2 are connected to the forward voltage. The common terminal of the first relay K1 and the second relay K2 are respectively connected to the driver. The voltage dependent resistor MOV1 is connected between the common terminal of the first relay K1 and the second relay K2. The two ends of the coil of the first relay K1 and the second relay K2 are connected to the power circuit 5. Additionally, the first diode D1 and the coil of the first relay K1 are connected in parallel. The negative electrode of the first diode D1 is connected to the positive electrode of the power circuit 5. The second diode D2 and the coil of the second relay K2 are connected in parallel. The negative electrode of the second diode D2 is connected to the positive electrode of the power circuit 5. The LCD display circuit 7 is connected to the microcontroller 4. The LCD display circuit 7 displays the status information of the control terminal. The switching of a closed state and open state of the first relay K1 and the second relay K2 can be controlled through adopting a switching circuit consisted of triodes. Additionally, the model number of the microcontroller 4 is STM8S207X.

Additionally, the motor control circuit 8 in this embodiment comprises at least two independent circuits. The two motor control circuits 8 can control two independent motors. One motor is used to adjust the seat back to tilt front and back, and the other motor is used to adjust the leg-supporting plate to move up and down.

Figure 3:
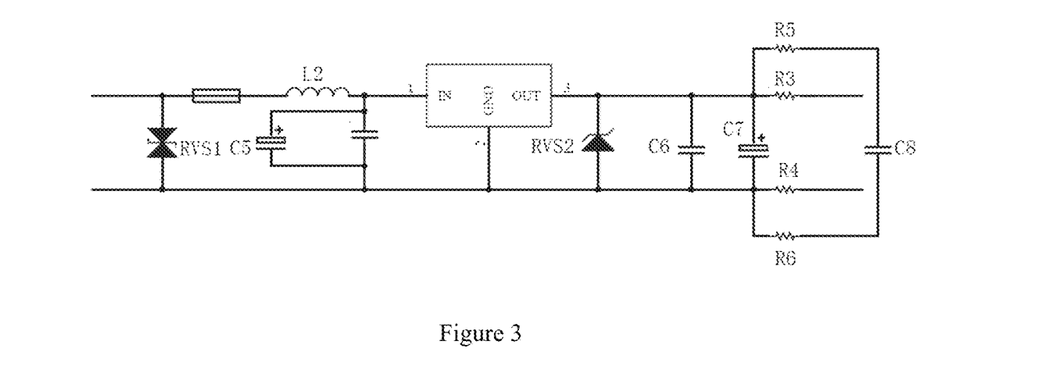
FIG. 3 is a structure diagram of the power circuit of the present invention.

As shown in FIG. 3, the power circuit 5 of the present invention comprises a DC-DC power module, a second inductance L2, a first voltage-regulator tube RVS1, a fifth capacitor C5, a second voltage-regulator tube RVS2, a sixth capacitor C6, a seventh capacitor C7, an eighth capacitor C8, a third resistor R3, a fourth resistor R4, a fifth resistor R5 and a sixth resistor R6. The input pin of the DC-DC power module is connected to the second inductance L2. The positive electrode of the fifth capacitor C5 is connected to the input pin of the DC-DC power module. The negative electrode of the fifth capacitor C5 is connected to the ground pin of the DC-DC power module. The other end of the second inductance L2 is connected to one end of the first voltage-regulator tube RVS1, and the other end of the first voltage-regulator tube RVS1 is connected to the ground pin of the DC-DC power module. The second voltage-regulator tube RVS2 is connected between the output pin of the DC-DC power module and the ground pin of the DC-DC power module. The sixth capacitor C6 and the second voltage-regulator tube RVS2 are connected in parallel. The positive electrode of the seventh capacitor C7 is connected to the output pin of the DC-DC power module, and the negative electrode of the seventh capacitor C7 is connected to the ground pin of the DC-DC power module. One end of the third resistor R3 is connected to the positive electrode of the fifth capacitor C5, and one end of the fourth resistor R4 is connected to the negative electrode of the fifth capacitor C5. Additionally, one end of the fifth resistor R5 is connected to the positive electrode of the fifth capacitor C5, and one end of the sixth resistor R6 is connected to the negative electrode of the fifth capacitor C5. The eighth capacitor C8 is connected in series between the fifth resistor R5 and the sixth resistor R6.

Figure 5:
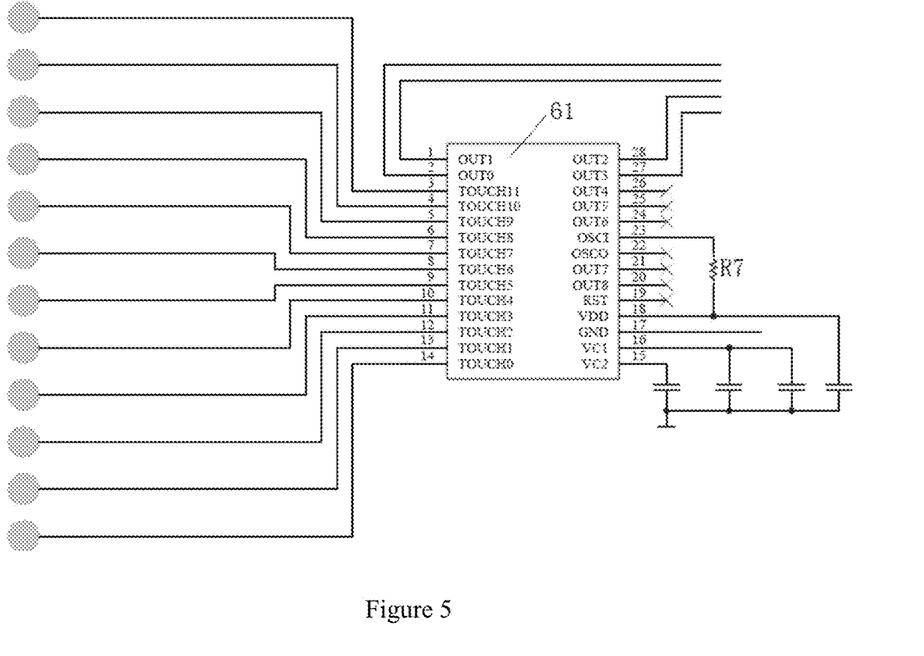
FIG. 5 is a structure diagram of the touch circuit of the present invention.
Figure 8:
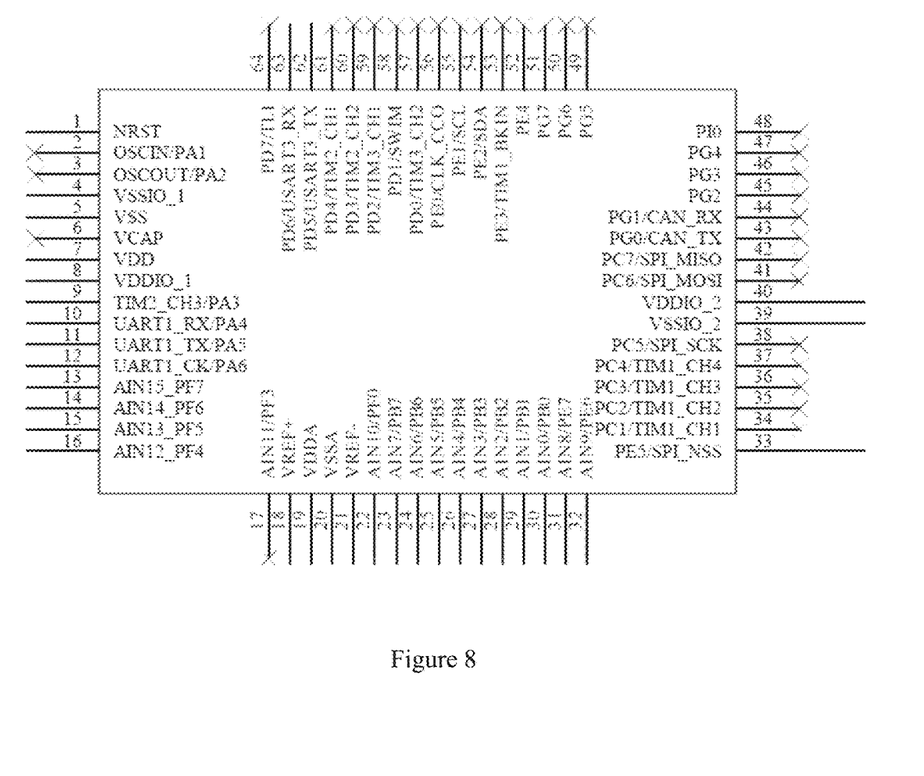
FIG. 8 is a structure diagram of the microcontroller of the present invention.

As shown in FIGS. 5 and 8, the touch circuit 6 in this embodiment comprises a touch sensitive chip 61, of which the model number is ADPT012. The twenty-third pin of the touch sensitive chip 61 is connected to one end of the seventh resistor R7, and the other end of the seventh resistor R7 is connected to the eighteenth pin of the touch sensitive chip 61. The first, second, twenty-seventh and twenty-eighth pin of the touch sensitive chip 61 are connected to the ninth, tenth, eleventh and twelfth pin of the microcontroller respectively. The fifteenth, sixteenth and eighteenth pin of the touch sensitive chip 61 are connected to the ground.

Figure 6:
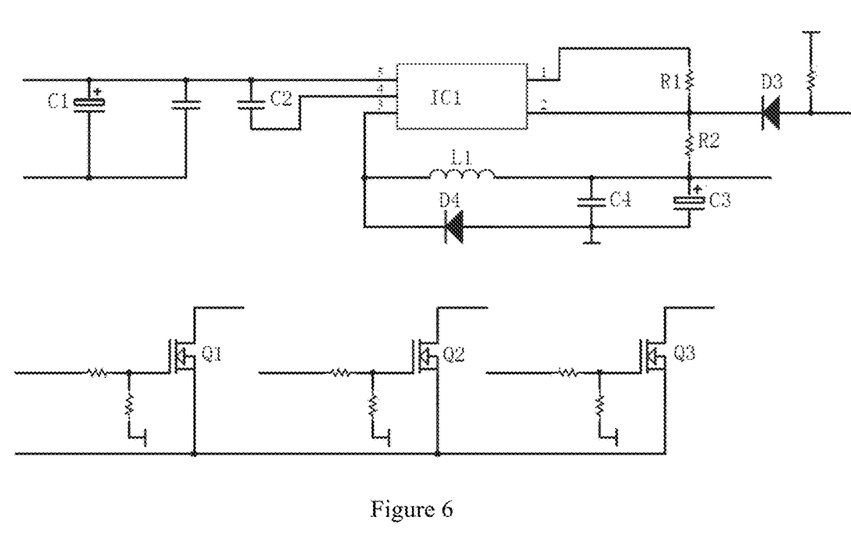
FIG. 6 is a structure diagram of the cooling, heating and massage control circuit of the present invention.

As shown in FIG. 6, the control terminal in this embodiment comprises a cooling, heating and massage control circuit 9. The cooling, heating and massage control circuit 9 further comprises a control circuit and a load power circuit. The control circuit can control the on/off of the load power circuit. The load power circuit comprises a step-down chip IC1 and an external circuit. The external circuit comprises a first capacitor C1, a second capacitor C2, a third capacitor C3, a fourth capacitor C4, a first inductance L1, a first resistor R1, a second resistor R2 and a fourth diode D4. The first inductance L1 and the second resistor R2 are connected in series between the third pin of the step-down chip IC1 and the second pin of the step-down chip IC1. The first inductance L1 and the second resistor R2 are connected in series. The connection point between the first inductance L1 and the second resistor R2, which is connected to the fourth capacitor C4, is connected to the ground. The positive electrode of the fourth diode D4 is connected to the negative electrode of the third capacitor C3, and the negative electrode of the fourth diode D4 is connected to the third pin of the step-down chip IC1. Additionally, the positive electrode of the fourth diode D4 and the negative electrode of the third capacitor C3 are connected to the ground. The second resistor R2 is connected in series between the first pin of the step-down chip IC1 and the second pin of the step-down chip IC1. The second pin of the step-down chip IC1 is connected to the negative electrode of the third diode, and the positive electrode of the third diode is connected to a DC power. The fourth pin of the step-down chip IC1 is connected to the fifth pin of the step-down chip IC1 through the second capacitor C2. The fifth pin of the step-down chip IC1 is connected to the positive electrode of the first capacitor C1, and the negative electrode of the first capacitor C1 is connected to the ground. The control circuit comprises a first field-effect transistor Q1, a second field-effect transistor Q2 and a third field-effect transistor Q3. The source electrodes of the first field-effect transistor Q1, the second field-effect transistor Q2 and the third field-effect transistor Q3 are connected. The drain electrode of the first field-effect transistor Q1 is connected to the cooling equipment; and, the drain electrode of the second field-effect transistor Q2 is connected to the heating equipment. The drain electrode of the third field-effect transistor Q3 is connected to the massage apparatus. The model number of the step-down chip is XL4015. The heating equipment is a heating wire. The massage apparatus is a massage motor and the cooling equipment is a cooling fin.

Figure 7:
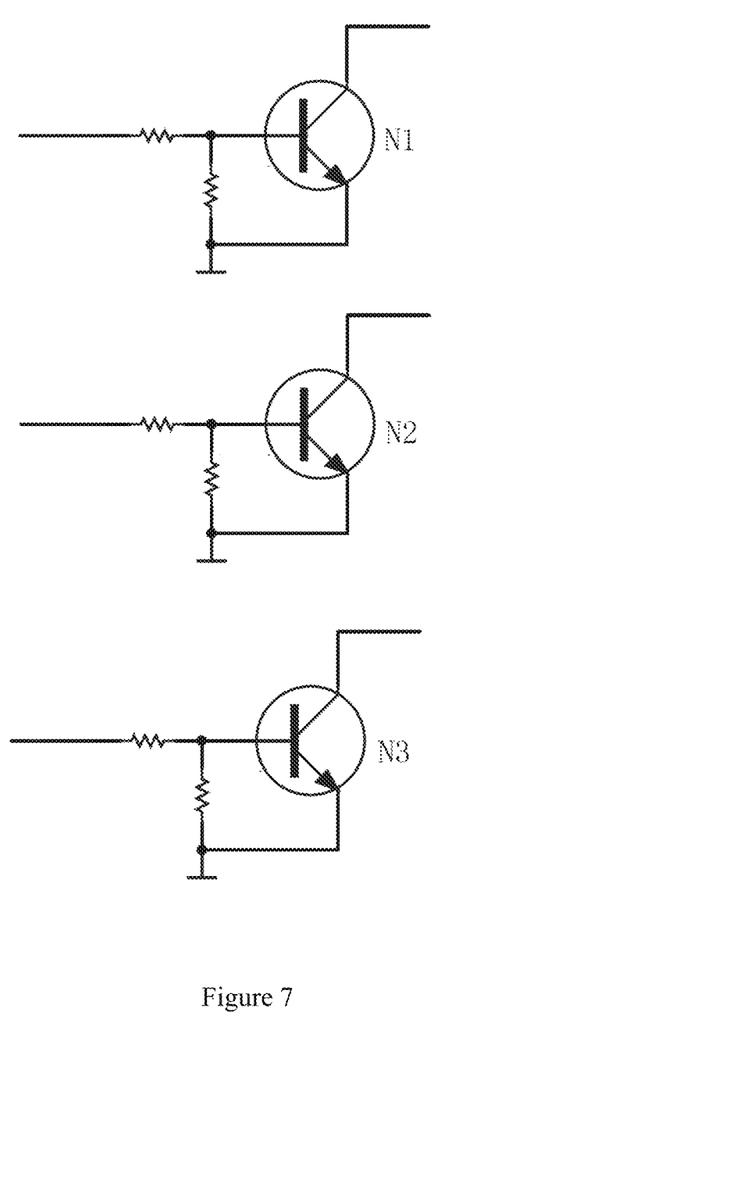
FIG. 7 is a structure diagram of the RGB color-mixing circuit of the present invention.

As shown in FIG. 7, this embodiment further comprises a RGB color-mixing circuit. The RGB color-mixing circuit comprises a first triode N1, a second triode N2 and a third triode N3. The source electrodes of the first triode N1, the second triode N2 and the third triode N3 are connected to the ground. The grid electrodes of the first triode N1, the second triode N2 and the third triode N3 are connected to the microcontroller 4. The drain electrodes of the first triode N1, the second triode N2 and the third triode N3 are connected to the RGB three-colored LED.

This embodiment further comprises a sensor 11. The sensor 11 is connected to the control circuit. The control circuit can receive the information collected by the sensor 11 and send a control instruction to the RGB color-mixing circuit.

Once the switching button 21 of the present invention is pressed, the selection of the driver is changed accordingly, and the display screen 1 displays which driver is currently selected. The operational information of the selected driver is also displayed on the screen. Triggering the regulating button 22 of a corresponding driver, the corresponding driver can receive and run the instruction when the information is correctly processed. The selection of the driver is changed in the following process: once the switching button 21 is pressed, a driver is sequentially selected; when each driver is sequentially selected once, then all of the drivers are selected together when the switching button 21 is pressed again. The selecting process can be repeated in such a way. Additionally, once the drivers are selected together, all of the drivers can be controlled by pressing the regulating button. And when the reset button 24 is triggered, all of the drivers can be reset.

The drivers of the present invention are external power for adjusting the adjustable chairs, and the stretching and contracting action of the drivers control the seat back to tilt front and back as well as to support the user's legs.

The previous descriptions are of preferred examples for implementing the invention, and the scope of the invention should not necessarily be limited by this description. The scope of the present invention is defined by the claims.

The invention claimed is:

1. A touch controller having a display screen, comprising:
   a display screen,
   a touch integrated module,
   a control circuit, and
   a housing;
   wherein the display screen, the touch integrated module and the control circuit are separately fixed to the housing; wherein the touch integrated module is connected to the control circuit, and the touch integrated module can be triggered to send an instruction to the control circuit; wherein the display screen is connected to the control circuit, showing the operational information of the instruction after the data processing of the control circuit; wherein the touch controller having a display screen can simultaneously control at least two drivers, wherein the control circuit comprising:
   a microcontroller,
   a power circuit,
   a touch circuit,
   a control terminal, and
   a LCD display circuit;
   wherein the power circuit is connected to the microcontroller, providing power to the microcontroller; wherein the touch circuit is connected to the microcontroller so that an instruction can be sent to the microcontroller through the touch circuit; wherein the microcontroller can recognize the instruction sent by the touch circuit, and send the action instruction to a corresponding control terminal; wherein the control terminal comprises a motor control circuit; wherein the motor control circuit comprising:
   a first relay,
   a first diode,
   a second relay,
   a second diode, and
   a voltage dependent resistor;
   wherein the normally-closed terminal of the normally-closed contact of the first relay is connected to that of the second relay; wherein the normally-open terminal of the first relay and that of the second relay are connected to the forward voltage; wherein the common terminal of the first relay and that of the second relay are respectively connected to the driver; wherein the voltage dependent resistor is connected between the common terminal of the first relay and that of the second relay; wherein the two ends of the coil of the first relay and that of the second relay are connected to the power; wherein the first diode and the coil of the first relay are connected in parallel; wherein the negative electrode of the first diode is connected to the positive electrode of the power; wherein the second diode and the coil of the second relay are connected in parallel; wherein the negative electrode of the second diode is connected to the positive electrode of the power; wherein the LCD display circuit is connected to the microcontroller, showing the status information of the control terminal.

2. The touch controller having a display screen of claim 1, wherein the power circuit comprising:
   a DC-DC power module,
   a second inductance,
   a first voltage-regulator tube,
   a fifth capacitor,
   a second voltage-regulator tube,
   a sixth capacitor,
   a seventh capacitor,
   an eighth capacitor,
   a third resistor,
   a fourth resistor,
   a fifth resistor, and
   a sixth resistor;
   wherein the input pin of the DC-DC power module is connected to the second inductance; wherein he positive electrode of the fifth capacitor is connected to the input pin of the DC-DC power module; wherein the negative electrode of the fifth capacitor is connected to the ground pin of the DC-DC power module; wherein the other end of the second inductance is connected to one end of the first voltage-regulator tube, and the other end of the first voltage-regulator tube is connected to the ground pin of the DC-DC power module; wherein the second voltage-regulator tube is connected between the output pin of the DC-DC power module and the ground pin of the DC-DC power module; wherein the sixth capacitor and the second voltage-regulator tube are connected in parallel; wherein the positive electrode of the seventh capacitor is connected to the output pin of the DC-DC power module, and the negative electrode of the seventh capacitor is connected to the ground pin of the DC-DC power module; wherein one end of the third resistor is connected to the positive electrode of the fifth capacitor, and one end of the fourth resistor is connected to the negative electrode of the fifth capacitor; wherein one end of the fifth resistor is connected to the positive electrode of the fifth capacitor, and one end of the sixth resistor is connected to the negative electrode of the fifth capacitor; wherein the eighth capacitor is connected in series between the fifth resistor and the sixth resistor.

3. The touch controller having a display screen of claim 1, wherein the motor control circuit comprises at least two independent circuits.

4. The touch controller having a display screen of claim 1, wherein the touch circuit comprises a touch sensitive chip; wherein twenty-third pin of the touch sensitive chip is connected to one end of a seventh resistor, and the other end of the seventh resistor is connected to a eighteenth pin of the touch sensitive chip.

5. The touch controller having a display screen of claim 1, wherein the control terminal comprises a cooling, heating and massage control circuit; wherein the cooling, heating and massage control circuit comprises a control circuit and a load power circuit; wherein the control circuit can control the on/off of the load power circuit; wherein the load power circuit comprises a step-down chip and an external circuit; wherein the external circuit comprising:
  a first capacitor,
  a second capacitor,
  a third capacitor,
  a fourth capacitor,
  a first inductance,
  a first resistor,
  a second resistor and
  a fourth diode;
  wherein the first inductance and the second resistor are connected in series between the third pin of the step-down chip and the second pin of the step-down chip; wherein the first inductance and the second resistor are connected in series; wherein the connection point between the first inductance and the second resistor, which is connected to the fourth capacitor, is further connected to the ground; wherein the positive electrode of the fourth diode is connected to the negative electrode of the third capacitor, and the negative electrode of the fourth diode is connected to the third pin of the step-down chip; wherein the positive electrode of the fourth diode and the negative electrode of the third capacitor are connected to the ground; wherein the second resistor is connected in series between the first pin of the step-down chip and the second pin of the step-down chip; wherein the second pin of the step-down chip is connected to the negative electrode of the third diode, and the positive electrode of the third diode is connected to a DC power; wherein the fourth pin of the step-down chip is connected to the fifth pin of the step-down chip through the second capacitor; wherein the fifth pin of the step-down chip is connected to the positive electrode of the first capacitor, and the negative electrode of the first capacitor is connected to the ground;

wherein the control circuit comprising:
  a first field-effect transistor,
  a second field-effect transistor, and
  a third field-effect transistor;
  wherein the source electrodes of the first field-effect transistor, the second field-effect transistor and the third field-effect transistor are connected; wherein the drain electrode of the first field-effect transistor is connected to the cooling equipment; wherein the drain electrode of the second field-effect transistor is connected to the heating equipment; wherein the drain electrode of the third field-effect transistor is connected to the massage apparatus;
  wherein the model number of the chip of the step-down DC power converter is XL4015.

6. The touch controller having a display screen of claim 1, wherein the control terminal comprises a RGB color-mixing circuit; wherein the RGB color-mixing circuit comprising:
  a first triode,
  a second triode, and
  a third triode;
  wherein the source electrodes of the first triode, the second triode and the third triode are connected to the ground; wherein the grid electrodes of the first triode, the second triode and the third triode are connected to the microcontroller; wherein the drain electrodes of the first triode, the second triode and the third triode are connected to the RGB three-colored LED.

7. The touch controller having a display screen of claim 6, wherein the touch controller having a display screen comprises a sensor; wherein the sensor is connected to the control circuit; wherein the control circuit can receive the information collected by the sensor and send a control instruction to the RGB color-mixing circuit.

* * * * *